United States Patent
Pande et al.

(10) Patent No.: US 11,373,233 B2
(45) Date of Patent: Jun. 28, 2022

(54) ITEM RECOMMENDATIONS USING CONVOLUTIONS ON WEIGHTED GRAPHS

(71) Applicant: Target Brands, Inc., Minneapolis, MN (US)

(72) Inventors: Amit Pande, Ames, IA (US); Kai Ni, Chanhassen, MN (US)

(73) Assignee: Target Brands, Inc., Minneapolis, MN (US)

( * ) Notice: Subject to any disclaimer, the term of this patent is extended or adjusted under 35 U.S.C. 154(b) by 93 days.

(21) Appl. No.: 16/778,158

(22) Filed: Jan. 31, 2020

(65) Prior Publication Data

US 2020/0250734 A1  Aug. 6, 2020

Related U.S. Application Data

(60) Provisional application No. 62/800,399, filed on Feb. 1, 2019.

(51) Int. Cl.
*G06Q 30/06* (2012.01)
*G06F 16/9535* (2019.01)
(Continued)

(52) U.S. Cl.
CPC ... *G06Q 30/0631* (2013.01); *G06F 16/24578* (2019.01); *G06F 16/9535* (2019.01);
(Continued)

(58) Field of Classification Search
CPC . G06Q 30/0601–0645; G06Q 30/0201; G06Q 10/087; G06F 16/9535; G06F 16/24578
(Continued)

(56) References Cited

U.S. PATENT DOCUMENTS

| 5,461,699 A | 10/1995 | Arbabi et al. |
| 5,696,907 A | 12/1997 | Tom |

(Continued)

FOREIGN PATENT DOCUMENTS

| CN | 108052966 | 5/2018 | |
| WO | WO-2017019534 A1 * | 2/2017 | ............ G06F 21/45 |
| WO | 2017083399 A2 | 5/2017 | |

OTHER PUBLICATIONS

Jason Brownlee, "Loss and Loss Functions for Training Deep Learning Neural Networks" Jan. 28, 2019, Machine Learning Mastery (Year: 2019).*

(Continued)

*Primary Examiner* — Yogesh C Garg
(74) *Attorney, Agent, or Firm* — Merchant & Gould P.C.

(57) ABSTRACT

Methods and systems for generating item recommendations are disclosed. One method includes sampling from a weighted node-based graph to generate a sampled graph, wherein sampling includes selecting a plurality of nodes and, for each selected node, one or more node pairs. The selection of the node pairs is based at least in part based on a weight assigned to the node pair in the weighted node-based graph. The method further includes aggregating information from the one or more neighboring nodes into each corresponding node of the plurality of nodes in the sampled graph to generate a vector representation of the sampled graph. The method also includes applying a loss function to the vector representation of the sampled graph to generate a modified vector representation. The modified vector representation is used to generate, in response to identification of an item from an item collection, a selection of one or more recommended items from within the item collection.

10 Claims, 10 Drawing Sheets

(51) Int. Cl.
  *G06F 16/2457* (2019.01)
  *G06Q 10/08* (2012.01)
  *G06Q 30/02* (2012.01)
  *G06N 3/08* (2006.01)

(52) U.S. Cl.
  CPC ....... *G06Q 10/087* (2013.01); *G06Q 30/0201* (2013.01); *G06Q 30/0643* (2013.01); *G06N 3/08* (2013.01)

(58) Field of Classification Search
  USPC ................................................ 705/26.1–27.2
  See application file for complete search history.

(56) References Cited

U.S. PATENT DOCUMENTS

| 2002/0120435 | A1  | 8/2002 | Frazier et al. |
| 2006/0112028 | A1  | 5/2006 | Xiao et al. |
| 2014/0129371 | A1  | 5/2014 | Wilson et al. |
| 2015/0149484 | A1* | 5/2015 | Kelley ............... G06Q 30/0631 707/748 |
| 2018/0247224 | A1  | 8/2018 | Garcia Duran et al. |
| 2019/0140988 | A1* | 5/2019 | Snider ................... G06F 16/248 |
| 2019/0286658 | A1* | 9/2019 | Leskovec ............ G06F 16/9035 |

OTHER PUBLICATIONS

Rex Ying et al.(Stanford University), "Graph Convolutional Neural Networks for Web-Scale Recommender Systems", Association for Computing Machinery, 2018, 10 Pages.

William L. Hamilton et al. (Department of Computer Science, Stanford University), "Inductive Representation Learning on Large Graphs", 31st Conference on Neural Information Processing Systems (NIPS), 2017, 11 Pages.

* cited by examiner

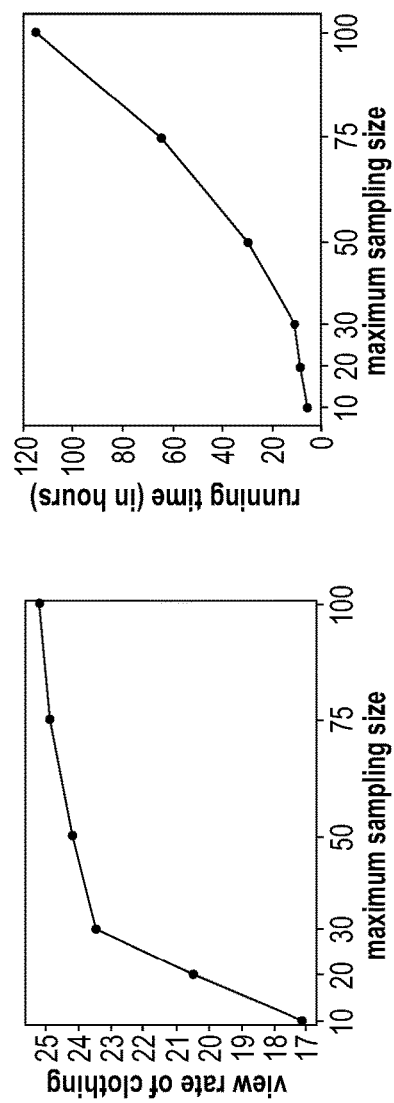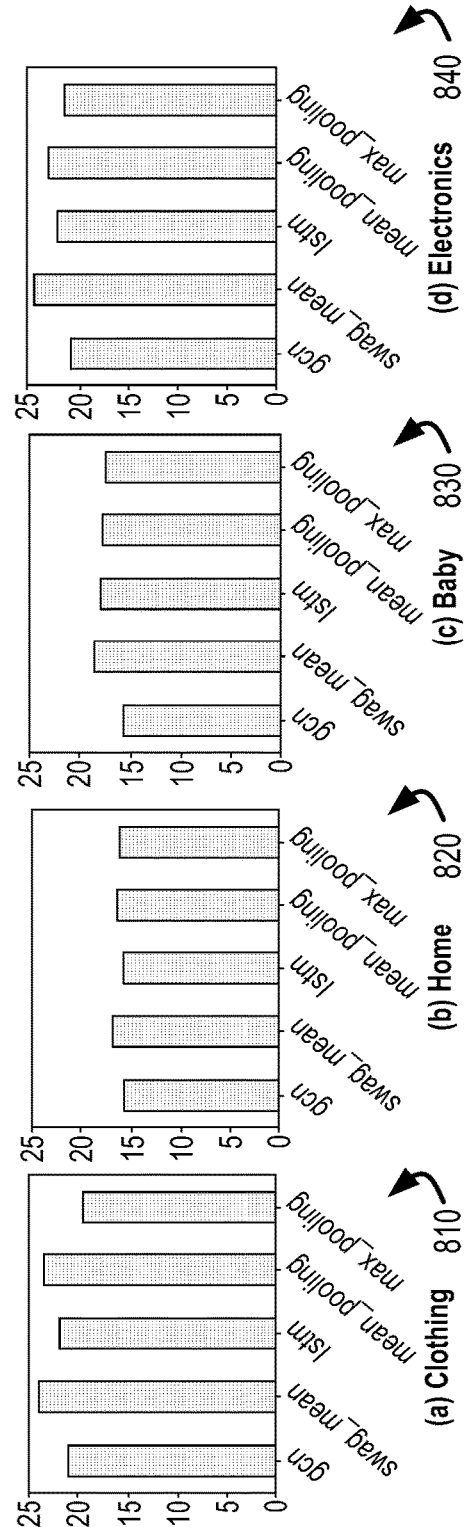
FIG. 7
FIG. 8

FIG. 9

ITEM RECOMMENDATIONS USING CONVOLUTIONS ON WEIGHTED GRAPHS

BACKGROUND

The present application claims priority from U.S. Provisional Patent Application No. 62/800,399, filed on Feb. 1, 2019, the disclosure of which is hereby incorporated by reference in its entirety.

BACKGROUND

Convolutional Neural Networks (CNNs) are used to establish state-of-the-art performance on many computer vision applications. CNNs consist of a series of parameterized convolutional layers operating locally (around neighboring pixels of an image) to obtain a hierarchy of features about an image. The first layer learns simple edge-oriented detectors. Higher layers build up on the learning of lower layers to learn more complex features and objects.

The success of CNNs in computer vision has inspired efforts to extend the convolutional operation from regular grids (2D images), to graph-structured data. Graphs, such as social networks, word co-occurrence networks, guest purchasing behavior, protein-protein interactions and communication networks, occur naturally in various real-world applications. Analyzing such graphs yields insight into the structure of society, language, and different patterns of communication. In such graphs, a node's neighborhood is of variable size; each node can have any number of connections to other nodes, unlike a pixel which has 8 nearest neighbors and 16 second degree neighbors and that too with a sense of directionality. Generalizing convolution to graph structures should allow models to learn location-invariant features. However, the extension of convolution to graph-structured data to date has not been scalable to large graphs, as it incurs quadratic computational complexity based on the number of nodes.

In existing efforts to extend CNNs to graph-structured data, the focus has been on finding approximations to graph convolutions that are computationally efficient, e.g., by not using an entire graph for purposes of training, in order to make such graph-based convolutions feasible for use at scale. In such systems, the model learns a function over inputs such as node attributes and node-neighborhood that can be inductively applied to any input graph or node in general. Such arrangements are particularly valuable to a retailer, since it is likely that the retailer's item assortment continually changes, as the retailer adds thousands to millions of items as well as guests (i.e., customers or potential customers) every few days.

It is desirable to train a model once and let it inductively generate powerful embedding on newer nodes (items or guests) without retraining on entire dataset. The high-dimensional information about a node's neighborhood (graph structure) as well as the node attributes (other higher dimensional information about a graph) can be efficiently condensed or encoded in the form of graph embeddings using unsupervised graph embedding methods for dimensionality reduction. These node embeddings can then be fed to downstream machine learning systems and aid in tasks such as node classification, clustering, and link prediction. Typically, node embeddings are generated by sampling pair-wise relationships from the graph through random walks and counting node co-occurrences. Then, an aggregation function or an embedding model is trained to learn representations that encode pairwise node similarities.

However, even with such recent advancements in applying convolutions to graphs, there remain deficiencies with respect to how well models generated using such convolutions represent the relationships among nodes. As such, when used, the models may generate sub-optimal results. Accordingly, improvements in modeling using graph structures are desirable.

SUMMARY

Generally, the present disclosure relates to methods and systems for generating product recommendations from among a set of items in an item collection, such as products available at a retailer website. In some example aspects, product recommendations are generated from weighted graphs that are generated from item images and item descriptions, and weights are generated based on user activity indicating a relationship between two items in an item collection.

In a first aspect, a method of generating an item recommendation from among an item collection is disclosed. The method includes sampling from a weighted node-based graph to generate a sampled graph, wherein sampling includes selecting a plurality of nodes and, for each selected node, one or more node pairs, each node pair of the one or more node pairs including the node and one or more neighboring nodes, the selection of the one or more node pairs being based at least in part based on a weight assigned to the node pair in the weighted node-based graph. The method also includes aggregating information from the one or more neighboring nodes into each corresponding node of the plurality of nodes in the sampled graph to generate a vector representation of the sampled graph, wherein aggregating information comprises applying one or more convolutional modules of a graph convolutional network. The method further includes applying a loss function to the vector representation of the sampled graph to generate a modified vector representation. The method includes using the modified vector representation to generate, in response to identification of an item from an item collection, a selection of one or more recommended items from within the item collection.

In a second aspect, a system configured to generate item recommendations is disclosed. The system includes a computing system including a programmable circuit operatively connected to a memory. The memory stores computer-executable instructions which, when executed by the programmable circuit, cause the computing system to perform: sampling from a weighted node-based graph to generate a sampled graph, wherein sampling includes selecting a plurality of nodes and, for each selected node, one or more node pairs, each node pair of the one or more node pairs including the node and one or more neighboring nodes, the selection of the one or more node pairs being based at least in part based on a weight assigned to the node pair in the weighted node-based graph; aggregating information from the one or more neighboring nodes into each corresponding node of the plurality of nodes in the sampled graph to generate a vector representation of the sampled graph, wherein aggregating information comprises applying one or more convolutional modules of a graph convolutional network; applying a loss function to the vector representation of the sampled graph to generate a modified vector representation; and using the modified vector representation to generate, in response to identification of an item from an item collection, a selection of one or more recommended items from within the item collection.

In yet another aspect, a method of providing an item recommendation for a customer of a retail enterprise is disclosed. The method includes receiving, from the customer, a selection of an inventory item at a retail website. In response to receiving the selection, a weighted graph-based convolution is utilized to generate a set of related inventory items. The set of related inventory items is displayed at the retail website.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIGS. 7A-B illustrates effects on view rate and computation time for different sample sizes, utilizing the item recommendation systems described herein.

FIGS. 8A-D illustrates effects of using various aggregation methodologies on rates of viewing of recommended items, utilizing the item recommendation systems described herein.

FIG. 9 illustrates an example set of recommended items based on similarity determinations performed using a plurality of different item recommendation algorithms.

DETAILED DESCRIPTION

As briefly described above, embodiments of the present invention are directed to methods and systems for generating item recommendations using convolutions on weighted graphs. Generally, this includes performing sampling, weighting, and aggregation processes for purposes of modeling relationships among items to identify such item recommendations. In example implementations, weights in graphs (e.g., edge weights) are used for sampling, aggregation as well as generation of random walks and measuring loss. Accordingly, such a framework can be used to generate related product recommendations for a retailer to present to a user, e.g., in an online retail environment.

In some embodiments, related product recommendations can be generated for a retailer to combine the insights from (a) product or item description (text), (b) item images and (c) purchase behavior (views/add-to-cart/purchases) into a single framework. Such a combination of image and text descriptions provides certain advantages in terms of accuracy of generated recommendations relative to image or item attributes-based deep learning, or unweighted graph based approaches. In particular, in the context of items presented by a retail website, the links between nodes of a graph convey specific information which is not properly captured by existing architectures. The weights between nodes may signify the cost or advantages or popularity of a transition from one node to another. For example—weights between two nodes in a graph may represent the probability of co-views, co-purchases, rate of substitution or cost of substitution, depending on the application usage.

Use of such weighted links between nodes, in combination with graph-based convolutions, allow neural networks to retain a state that can represent information from its neighborhood with arbitrary depth. Still further, by using attribute-based deep learning, recommendations among products based on specific attributes may be easily generated.

Figure 1:
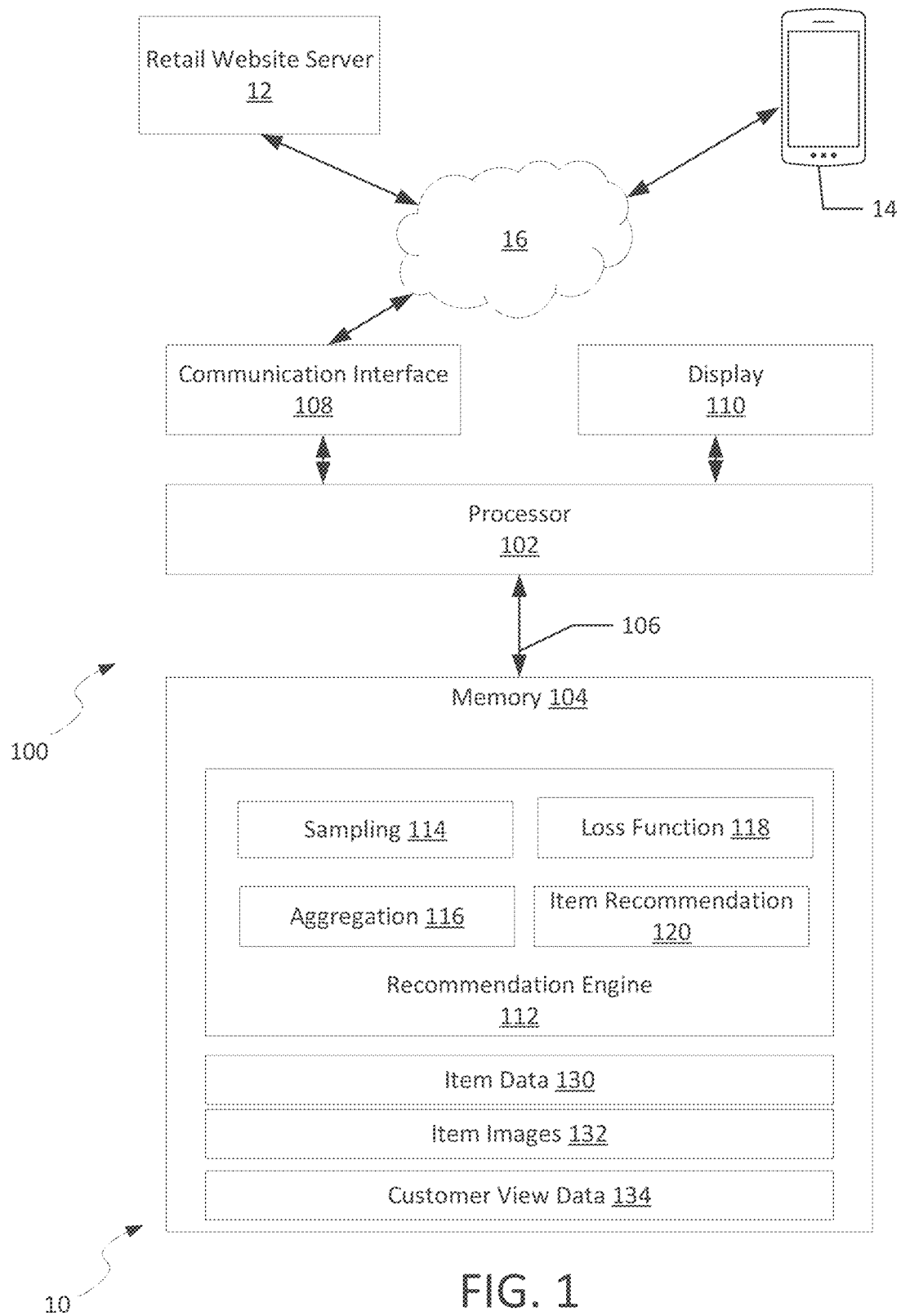
FIG. 1 illustrates a system for presenting items in an online environment, and in particular in a retail context, according to an example embodiment.

Referring to FIG. 1, a system 10 for presenting items in an online environment based on other item selections is shown, and in particular in a retail context, according to an example embodiment. The system includes a recommendation modeling computing system 100, communicatively connected to a retail web server 12 and a user device 14 via network 16 (e.g., the Internet). The retail web server 12 presents items to a user device, which displays such items to the user via either a browser or application.

The recommendation modeling computing system 100 includes a processor 102 communicatively connected to a memory 104 via a data bus 106. The processor 102 can be any of a variety of types of programmable circuits capable of executing computer-readable instructions to perform various tasks, such as mathematical and communication tasks.

The memory 104 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

In the embodiment shown, the memory 104 stores a recommendation modeling engine 112, discussed in further detail below. The computing system 100 can also include a communication interface 108 configured to receive and transmit data, for example to access data in an external database, or to provide such item recommendations to a retail web server 12 for presentation to a user device 14.

Additionally, a display 110 can be used for viewing recommendation information generated by recommendation modeling engine 112.

In various embodiments, the recommendation modeling engine 112 performs a process including sampling, weighting, and aggregation of graph-based data, generated from a combination of image data 130, item data 132 (e.g., text descriptions of items), and user selection data 134 (e.g., page or item views, item selections, purchases, etc.). Details regarding use of such data is provided below.

In one example embodiment, the recommendation modeling engine includes a sampling subsystem 114, an aggregation subsystem 116, a loss function 118 and an item recommendation subsystem 120.

In the embodiment shown, the sampling subsystem 114 performs a graph sampling using a graph convolutional network (GCN). GCNs perform propagation guided by a graph structure. Accordingly, for any particular node, neighbors are selected for convolution. In an example and body meant described below, a subset of neighbors for any given node is selected based on edge weights of neighbors. Generally, the larger the weight of the edge, the greater the chances that a corresponding neighbor should be selected for sampling. Additional details are provided below in connection with FIG. 2 regarding sampling.

In the embodiment shown, the aggregation subsystem 116 obtains the selected neighbors for aggregation to the corresponding nodes for information clustering. This can include, for example, incrementally adding information from neighboring nodes while accounting for edge weights between the node and the neighboring node. Example aggregation functions can include a mean aggregator, an LSTM aggregator, a pooling aggregator, node2vec, or GCN. Other aggregation functions are useable as well.

In the embodiment shown, the loss function 118 is applied to output representations of the aggregation, and trains weight matrices and parameters of the aggregator functions using a stochastic gradient descent. Accordingly, the graph-based loss function encourages nearby nodes to have similar representations, while enforcing that representations of the disparate nodes are distinct. Additional details regarding the loss function are provided below in connection with FIG. 2.

In the embodiment shown, the item recommendation subsystem 120 receives the model generated using the sampling subsystem 114, the aggregation subsystem 116, and the loss function 118. The item recommendation subsystem 120 utilizes a model generated from the other subsystems and can receive an identification of an item within an item collection, e.g., from a retail web server 12. The item recommendation subsystem 120 can then utilize the model to identify one or more recommended items in response, which can be provided to the retail web server 12 for presentation to a user, as described below. The one or more recommended items can include one item, or a series of items.

Notably, the item collection on which the selection of items is generated may be modified relative to an item collection from which the model is generated (e.g., due to addition of items or removal of items. Accordingly, although an overall item collection may change over time, recommendations may be generated for that entire collection of items, including those which have been added since the initial (or an updated) item collection model was created.

Figure 2:
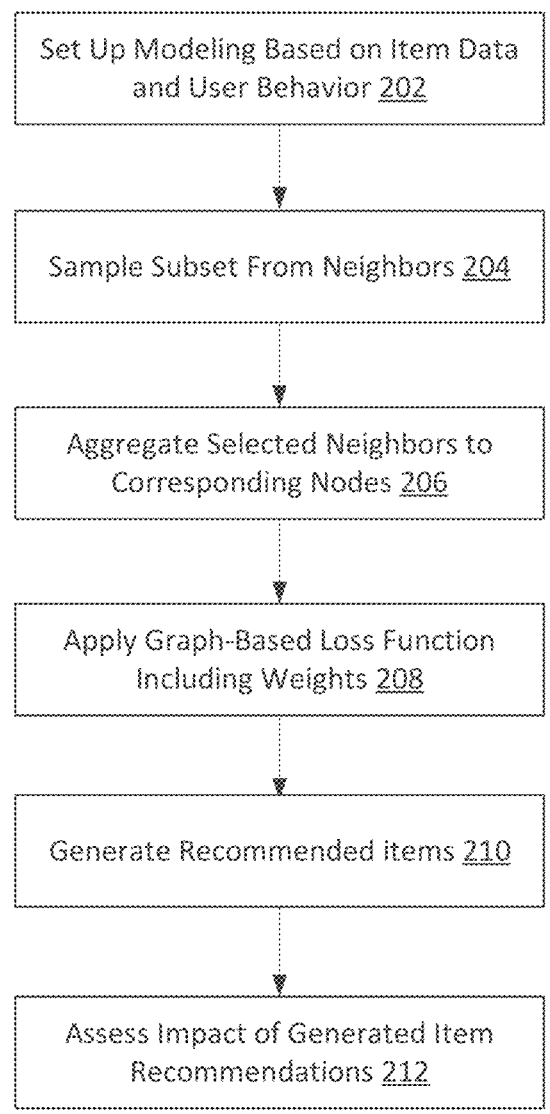
FIG. 2 illustrates a flowchart of a method for identifying recommended items from within an item collection, according to an example implementation.

FIG. 2 illustrates a flowchart of a method 200 for identifying recommended items from within an item collection, according to an example implementation. The method 200 can be performed using the system 10 of FIG. 1, above, and in particular the recommendation modeling computing system 100. In particular, the method 200 can be used to identify items that are in some way related to an initially selected item (as identified by, e.g., prior user activity).

In the embodiment shown, the method 200 includes setup for modeling useable to generate item recommendations (step 202). Setup can include, for example, generating a weighted graph of items in an item collection. The weighted graph can be generated based on item information and item selection information. For example, a graph can be generated from item images and item descriptions, with weights between items being generated based on item selection information (e.g., the likelihood that a user selecting one item will select another item from within the item collection). The item selection information can be based on user activity such as page views, item selections, purchases, etc. from a retailer website providing access to the item collection.

In example embodiments the weights applied to the graph can be generated in a number of ways. Generally each item represents a node, with relationships between nodes being weighted. Such weights may be, for example, generated based on a Jaccard index or based on weighted co-occurrences.

Additionally, node embeddings are generated for each node, based on information available about that node. In example embodiments, node embeddings can be generated based on all or some portion of the item data available. In the case of retail items available on a retail web server, item information can include text information (e.g., item descriptions) and image information. Other information may be utilized as well.

Continuing with FIG. 2, the method 200, in the embodiment shown, includes performing a sampling operation on the weighted graph (step 204). Sampling is very important in Graph Convolutional Networks. As opposed to computer vision, where convolutional neural networks can use pixel proximity as a feature, GCNs do propagation guided by the graph structure. Accordingly, for any given node, the neighbors used for convolution must be selected efficiently. In accordance with the present disclosure, a neighbor function, $N_s: V \rightarrow 2^V$, samples a subset of any given node $v \in V$ based on the edge weights of its neighbors. By way of contrast to existing systems, which select neighbors randomly and according to a uniform distribution, in the present disclosure neighbors are selected with a probability proportional to $s(u,v)^\beta$, where $s(u,v)$ is a weight of the edge and $\beta$ is a sampling degree parameter. The larger the weight of the edge, the greater the chance that a corresponding neighbor should be selected in sampling. When $\beta=0$, application of edge weights is neutralized, while larger values of $\beta$ imply that only neighbors with large edge weights will be selected. In an example embodiment, pseudocode for such a sampling algorithm may be depicted as follows:

Input: Graph G (V, E) and a weight function s(u,v) for any (u,v) ∈ E, a sampling hyper-parameter β
Output: Graph with homogeneous number of neighbors.
For each u ∈ V do
    W (u,v) = ks(u,v)$^\beta$, ∀v ∈ V s.t. $\Sigma_{all v}$ w (u,v) = 1
    Sample v ∈ V based on W (u,v)
End for Still continuing with FIG. 2, the method and 200 includes aggregating selected neighbors to corresponding nodes (step 206). In the aggregating operation, if there are two sources of input features (e.g., text and images, as in the example embodiments described herein), those two sources of input features can be combined as follows: $x_v = \sigma(x_{v1} + W^0 * x_{v2})$, $\forall v \in V$ where $W^0$ is a linear transformation matrix to ensure xv1 and xv2 in the same dimension and is a trainable parameter in training. Additionally, σ is a nonlinear element wise function.

Accordingly, at each iteration, or search depth, nodes aggregate information from their local neighbors. As this process iterates, nodes incrementally gain more and more information from further reaches of the graph from their neighbors. However, unlike prior works, a hidden state $h_u^{k-1}$ is discounted using the edge weight in aggregation to the state of node v. A multiplicative factor $s(u,v)^\gamma$ can be used to incorporate the importance of item-to-item view dependency so that higher weights are aggregated more than lower weights. An additional parameter, γ, also defines the extent to which neighbor weighting affects modeling. When γ=0, the multiplicative factor is neutralized; for larger values of γ, neighbors with higher weights contribute more to the aggregation. In an example embodiment, pseudocode for such an aggregation algorithm may be depicted as follows:

```
Input: Graph G'(V',E'): input features {x_v, ∀v ∈ V}; depth K; weight matrices W^k,
  ∀ k ∈ {1,.....,K}; non-linearity σ; differentiable aggregator functions π_k, ∀ k ∈ {1,.....,K};
  neighborhood function N:V → 2^V; edge weight function s(u,v), A(u.v) ∈ E.
Output: Vector representations z_v for all v ∈ V
H_v^0 ← x_v / ||x_v||, ∀v ∈ V.
for each k ∈ {1,.....,K} do
    for each v ∈ V do
        h^k_N(v) ← π_k ({w^γ h_u^{k-1}, ∀u ∈ N(v)})        (5)
        h^k_N(v) ← h^k_N(v)/|| h^k_N(v)||
        h^k_v ← σ (W^k * CONCAT(h_v^{k-1}, h_N(v)k))
    end for
        h^k_v ← h^k_v/|| h^k_v||
end for
        z_v ← h^k_v; ∀v ∈ V
```

As seen in the above, the aggregation function $\pi_k$, $\forall k \in \{1, \ldots K\}$ could be any of a number of aggregation functions, such as a mean aggregator, a long-short term memory (LSTM) aggregator, a pooling aggregator, a node2vec algorithm, or a graphical convolutional network (GCN). Other aggregation functions could be used as well.

Continuing with FIG. 2, a graph-based loss function is applied to the output representations $z_u$, $\forall u \in V$ of the aggregation (step 208). The weight matrices $W_k$, $\forall k \in \{1, \ldots K\}$ and parameters are the aggregation functions are trained via stochastic gradient descent. The graph-based loss function encourages nearby nodes to have similar representations, while enforcing that representations of desperate nodes remain distinct:

$$L_G(z_u) = -r(u,v) \propto \log(\sigma(z_u T z_v)) - Q^* E_{vn \sim Pn(v)} \log(\sigma(-z_u T z_{vn}))$$

In this loss function representation, v is a node that co-occurs near u on a fixed-length random walk, σ is the sigmoid function, $P_n$ is a negative sampling distribution, and Q defines the number of negative samples. Additionally, r(u,v) is an accumulated mean of the weights on the random walk for node u and v and α is another hyperparameter to be tuned for the exponential degrees of weights on random walks. In an example implementation, a geometric mean of weights along the random walk is used for r(u,v). Other selections could include, for example, arithmetic mean, maximum of weights of edges along the path. By adding the weights into the loss function, the algorithm becomes more focused on minimizing the distance between nodes u and v with larger edge weights.

Once the weighted loss function is applied, the output of convolution of the sampled weighted graph can be used to generate recommended items (step 210). The recommended items can include one or more item recommendations representing neighbors of a selected item. The selected item may be an item selected by receiving the item from a retail web server, e.g., in response to a user selecting that item for display from an item collection. Item recommendations can be returned to the retail web server for display to the user. The returned item recommendations can be returned in the form of an item identifier for each nearest neighbors according to a predetermined threshold of one or more items to be recommended. In some instance, 2-4 or more items may be recommended to the user.

In addition, optionally, within the method 200, impact of the generated item recommendations can be assessed (step 212). This may include, for example, determining a rate of selection of item recommendations generated according to the methodology described herein. Such a rate of selection can be used to tune the parameters of a model generated as described herein, for example, to improve performance, or to compare to other item recommendation approaches. Example ways in which impact of item recommendations can be assessed are described below.

Figure 3:
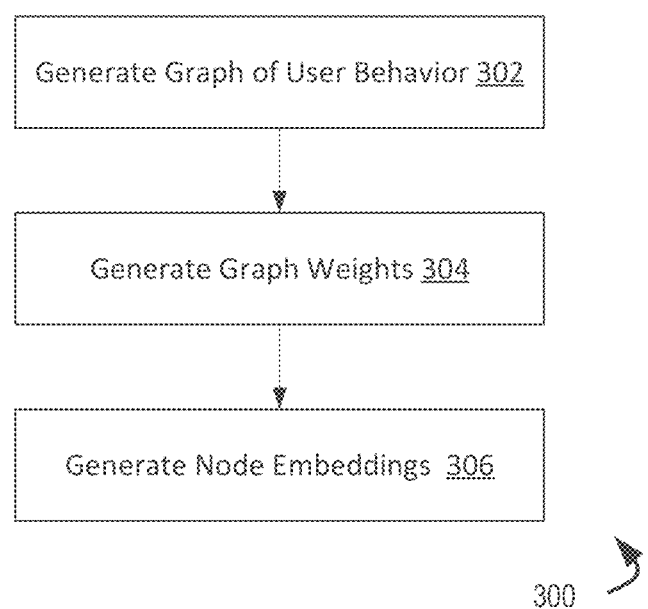
FIG. 3 illustrates a flowchart of a method for initializing a model useable to generate recommended items from within an item collection.
Figure 4:
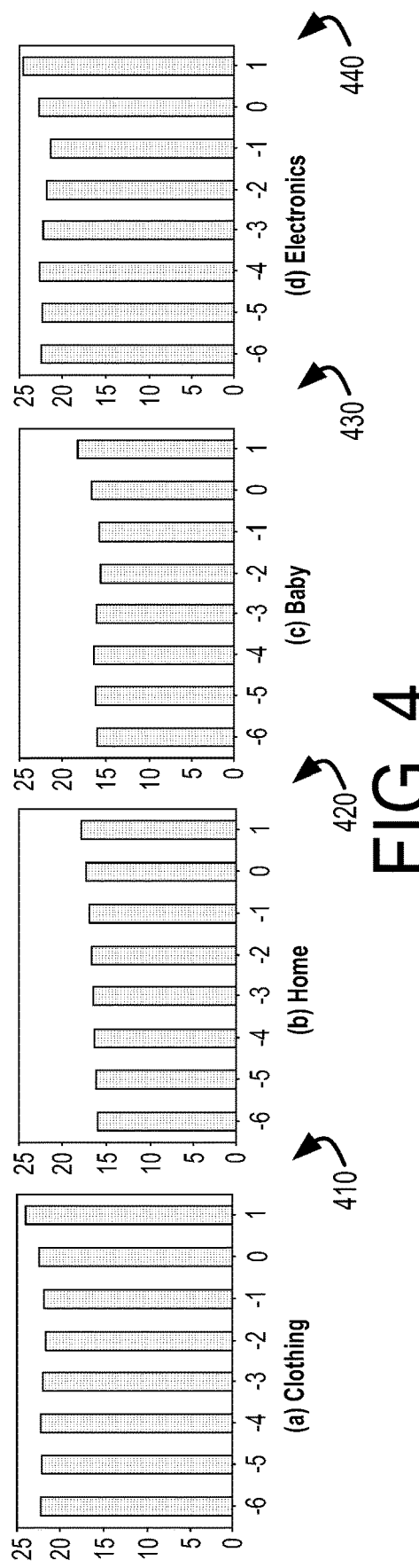
FIGS. 4A-D illustrates effects of altering a sampling parameter on rates of viewing of recommended items, utilizing the item recommendation systems described herein.
Figure 5:
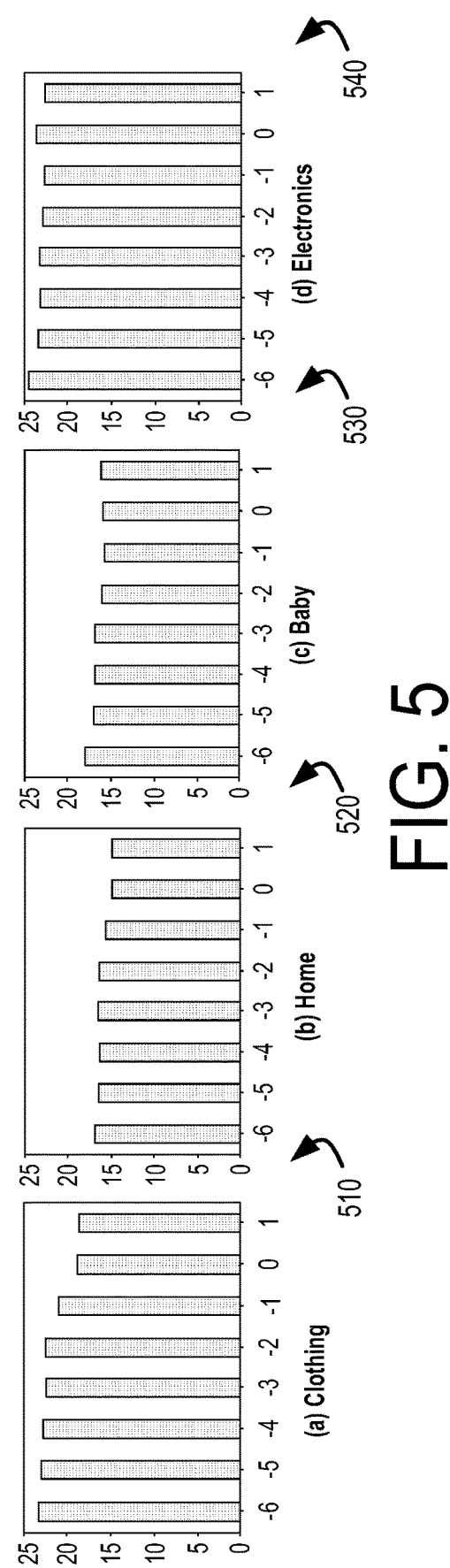
FIGS. 5A-D illustrates effects of altering an aggregation parameter on rates of viewing of recommended items, utilizing the item recommendation systems described herein.
Figure 6:
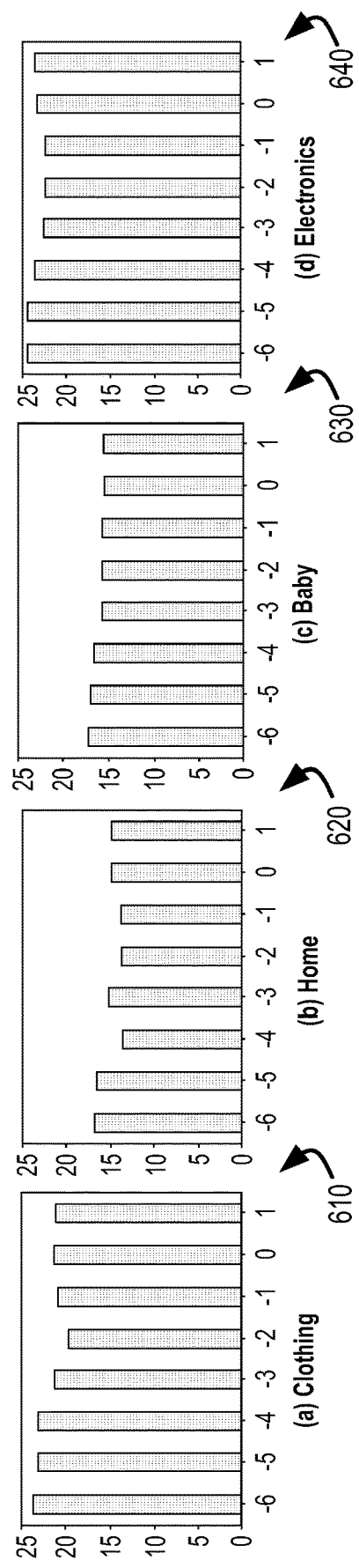
FIGS. 6A-D illustrates effects of altering a loss parameter on rates of viewing of recommended items, utilizing the item recommendation systems described herein.

FIG. 3 illustrates a flowchart of a method 300 for initializing a model useable to generate recommended items from within an item collection, such as items within a retail website. The method 300 can be used, for example, to set up the weighted graph used in the methods and systems described above in connection with FIGS. 1-2. Generally, the method 300 can include generating a graph of user behavior (step 302). As noted above, a graph can be generated from item images and item descriptions, with weights between items being generated based on item selection information (e.g., the likelihood that a user selecting one item will select another item from within the item collection). The item selection information can be based on user activity such as page views, item selections, purchases, etc. from a retailer website providing access to the item collection.

The method 300 can also include generating graph weights (step 304). As noted above, this can be performed using, for example, a Jaccard index or weighted co-occurrences. In the instance of a Jaccard index, the edges of a graph are weighted according to past customer views. Accordingly, weights are provided on all edges, and are calculated based on relative frequency of views for each pair of items. An arctangent-based transformation of the relative frequency is then generated. For example, for online items i and j, the relative frequency can be depicted as:

$$F(i,j) = (VC(I \cap j) / VC(IUj))$$

where VC(I∩j) is the number of guests that view items i and j in one session and VC(IUj) is the view counts for either item i or j being viewed in a session. In an online retail context, the relative view frequency F(i,j) for items i and j is usually very small; for example a 3% common view is a relatively large number for a pair of items. Accordingly, the relative frequency is divided by a median of frequency in one category to scale to the weight function, s: (V,V)→(0,1). Accordingly, a weight function can be represented as:

$$s(i,j)=2/\pi * \arctan(F(i,j)/\text{median of } F).$$

After this transformation, the weights are closer to a uniform distribution between 0-1.

In the case of weighted co-occurrences being used to generate weights, co-view counts are not the only action used; rather, other actions, such as adding an item to a cart or ultimately purchases of the two items together are features that are also utilized. In this example, different activities by a user are weighted using empirically determined weights. Additionally, a time delay on co-occurrences can be applied to capture the recency of items. In this example, weighted co-occurrence of products i and j for N customer session is given by:

$$s(i,j) = \sum_{s=1}^{s=N} W(i)W(j)/Rec(s)$$

where W(i) and W(j) are highest weights of products i and j in session s, and Rec(s) is recency of session s. Weights per node are then normalized and an arctangent transform is also applied to normalize the weights on a 0-1 scale. Other graph weighting approaches could be used as well.

Finally, the method includes generating node embeddings (step 306). This includes, for example, generating embeddings based on image data associated with the item, as well as embeddings based on text data associated with the item. In example embodiments, node embeddings include image embeddings that are generated using a pre-trained model, such as a VGG-16 model described in Karen Simonyan and Andrew Zisserman. *Very deep convolutional networks for large-scale image recognition. arXiv preprint arXiv:* 1409.1556, 2014. This publication is hereby incorporated by reference in its entirety. In such a model, a last fully connected layers are not used, but rather the output up to the convolutional layers and max-pool layers (i.e., the output of the average-pool layer, not the max-pool layer) is used. Item embeddings for text descriptions of the items are obtained by training a word embedding model on item attributes and descriptions included in an item collection. For example, item embeddings may be generated as described in: Tomas Mikolov, Ilya Sutskever, Kai Chen, Greg S Corrado, and Jeff Dean. *Distributed representations of words and phrases and their compositionality. In Advances in neural information processing systems*, pages 3111-3119, 2013. This publication is hereby incorporated by reference in its entirety.

Referring now to FIGS. 4-8, effects of altering various parameters or operations within the systems and methods described herein are depicted, as well as comparisons to existing item recommendation systems. As seen, by assessing and tuning parameters of the modeling systems described herein, useful item recommendations can be generated. This may be reflected, for example, in higher rates of selection of those recommended items by users.

For the testing performed in the below examples, separate models were trained for distinct categories of items, in this case, merchandise for an online retailer in the areas of clothing, home products, baby goods, and electronics items. These categories were selected because co-views or co-purchases across such a category have been found more relevant for users than have cross-category views or purchases. Additionally, different models are trained, based on an assumption that a role of item embeddings or image embeddings or past user behavior may differ depending on the category. Session logs for online user behavior as to each set of items were used. In this example, a word2vec algorithm was applied to item descriptions to generate 200 dimensional embeddings for the items in the categories, and image embeddings were generated using the VGG16 and ResNet-50 models (with the results depicted being based on the VGG-16 modeling).

For offline evaluation, past session logs of online user behavior were utilized. An offline evaluation to evaluate the performance of these embeddings against past user sessions was adopted. For example, if a user viewed item A and then viewed items B, C, D, E, and F in a past session, it was assumed that A is the seed item and B/C/D/E/F are the actual views of the user. This is then compared to the recommendations from the model in consideration and the actual view rate is calculated. View rate, in terms of the present disclosure, corresponds to the percentage of users who looked at top N recommendations (N is typically set to 5 as most users look at top 5 recommendations only) and clicked on one of them.

FIGS. 4A-D illustrate effects of altering a sampling parameter on rates of viewing of recommended items, utilizing the item recommendation systems described herein. In particular, hyperparameter β was altered in a range of 10-6 to 10, and the x-axis is the logarithmic of β. As can be seen in each category 410, 420, 430, 440 increasing β improves view rate, particularly when β=10 (maximum in this experiment).

FIGS. 5A-D illustrates effects of altering an aggregation parameter on rates of viewing of recommended items, utilizing the item recommendation systems described herein. In particular, hyperparameter γ was varied across each of the categories described above (clothing, home, baby, and electronics) over a similar range of values as β, above. As can be seen in FIGS. 5A-D, there is a significant dip in view rates for clothing in graph 510, as compared to relatively stable view rates for other categories, seen in graphs 520, 530, 540. Weighted aggregation seems to improve performance by lowering the relevance of low-weight neighbors.

FIGS. 6A-D illustrates effects of altering a loss parameter on rates of viewing of recommended items, utilizing the item recommendation systems described herein. In this example, an adjustment of loss parameter α is illustrated on a logarithmic scale (with the log-α on the x axis). As seen in FIGS. 6A-D, there is little impact on variance of α across categories. Low values of α have a slightly higher view rate across categories, seen in graphs 610, 620, 630, 640.

FIGS. 7A-B illustrates effects on view rate and computation time for different sample sizes, utilizing the item recommendation systems described herein. FIG. 7A illustrates a chart 710 showing that view rate increases significantly as sampling size increases to approximately 30 neighbors, then gradually increases. However, as seen in FIG. 7B, chart 720 illustrates that computational time significantly increases when the maximum sampling size exceeds 30 samples. This was performed in a graph with nodes having more than 100 neighbors, so sampling to a subset of those neighbors would be required. Accordingly, the data suggests a sample size of 30 or 50 would be ideal, given the improvement in view rates at those sample sizes and the trade-off with computational complexity. In the context of the tests above, for the clothing and home categories, a sample size of 30 was selected, and in electronics and baby categories, a sample size of 50 was selected.

FIGS. 8A-D illustrates effects of using various aggregation methodologies on rates of viewing of recommended items, utilizing the item recommendation systems described herein. As seen across the graphs 810, 820, 830, 840 across the categories, the GCN, mean aggregation, LSTM, mean pooling, and max pooling aggregation algorithms were assessed. In general the "swag_mean" (the algorithm described above) and "mean_pooling" aggregators provide the best performance by a narrow margin.

This is further reflected below in connection with Table I, which illustrates an impact of input node embeddings.

TABLE 1

View Rates in Categories Based on Embeddings

| View Rate | ID | II | SAGE | SWAG | SAGE (+ID) | SWAG (+ID) | SAGE (+II) | SWAG (+II) | SAGE (+II + ID) | SWAG (+II + ID) |
|---|---|---|---|---|---|---|---|---|---|---|
| Clothing | 16.2 | 10.0 | 10.5 | 10.5 | 22.4 | 23.5 | 16.5 | 20.2 | 22.5 | 23.6 |
| Home | 12.0 | 12.5 | 5.3 | 5.3 | 14.2 | 16.5 | 13.2 | 14.5 | 14.3 | 16.5 |
| Electronics | 20.5 | 20.2 | 7.2 | 7.2 | 21.9 | 25.1 | 20.5 | 21.5 | 22.1 | 25.2 |
| Baby | 12.5 | 13.5 | 3.4 | 3.4 | 14 | 14.5 | 16.8 | 17.5 | 17.0 | 17.6 |

In Table 1, headers are as follows: ID=Item Description; II=Image; SWAG=the algorithm described herein, without node embeddings; SAGE: GraphSAGE without node embeddings.

From these view rates, it can be observed that item description embeddings perform slightly better than image embeddings for clothing, and almost equal to image embeddings for other categories. This can be attributed to rich item description information available, as well as imperfections in using direct product images to generate embeddings. Additionally, product attributes include useful information describing the product, while product images may have background colors or individuals. Finally, the SAGE and SWAG models have same performance in absence of node embeddings. The computational time required for SWAG(+ID) is significantly lesser than the time required for SWAG (+II) and SWAG(+ID+II) variants. However, the performance (view rate) is better than or similar to those variants. For the Baby category, the basic SWAG model has very poor performance but incorporating node embeddings improve the view rates significantly.

Figure 9:
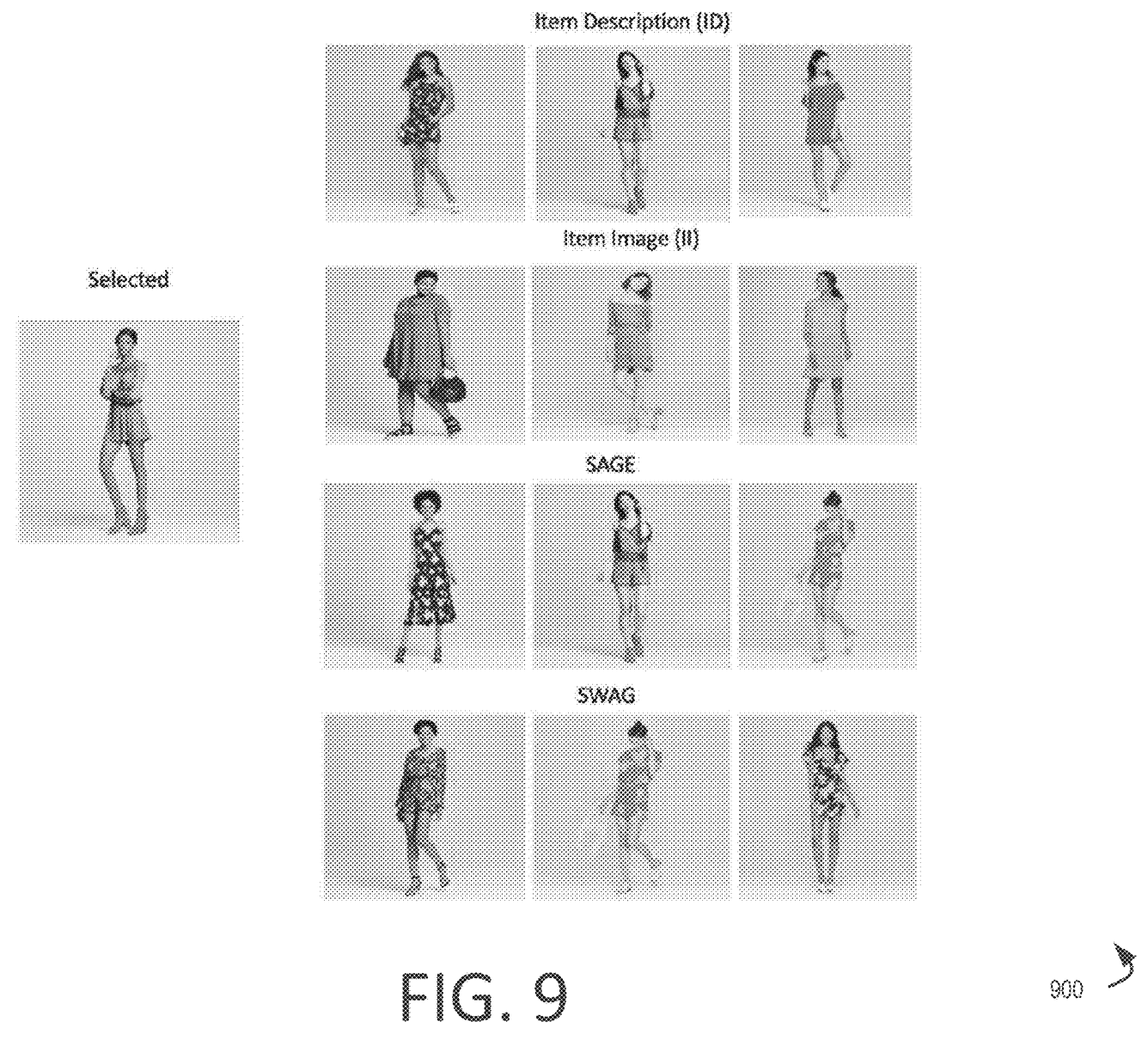

FIG. 9 illustrates an example set of recommended items 900 based on similarity determinations performed using a plurality of different item recommendation algorithms. This represents a common sense or visual validation of the item recommendations generated using the methods and systems described herein. As seen, based on a selected item, use of item description alone, item image alone, GraphSAGE, or SWAG algorithms result in varied recommendations. A long-sleeve short dress is selected as a test item. The item embeddings seem to focus on short dresses but all the top three recommendations (in this example) are short sleeveless dresses while the seed item dress has long sleeves. SAGE and SWAG combine these cues with co-view information and improve recommendations. For example, the first recommendation by the SWAG recommendation system is a short dress with full sleeve.

Figure 10:
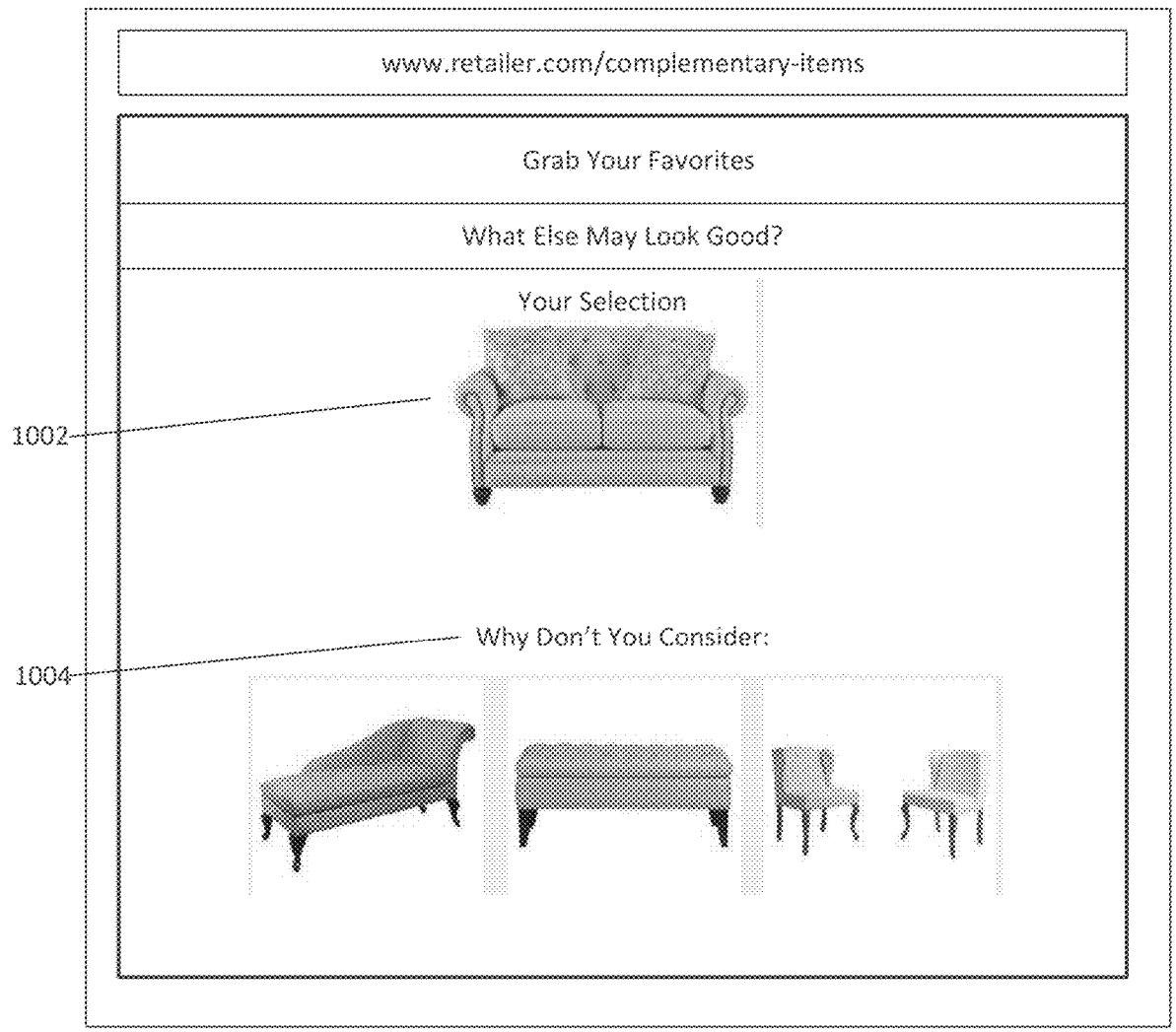
FIGS. 10A-D illustrate probability densities of pairwise cosine similarity for image embeddings, text embeddings, graph-based embeddings, and weighted graph-based embeddings.
Figure 11:
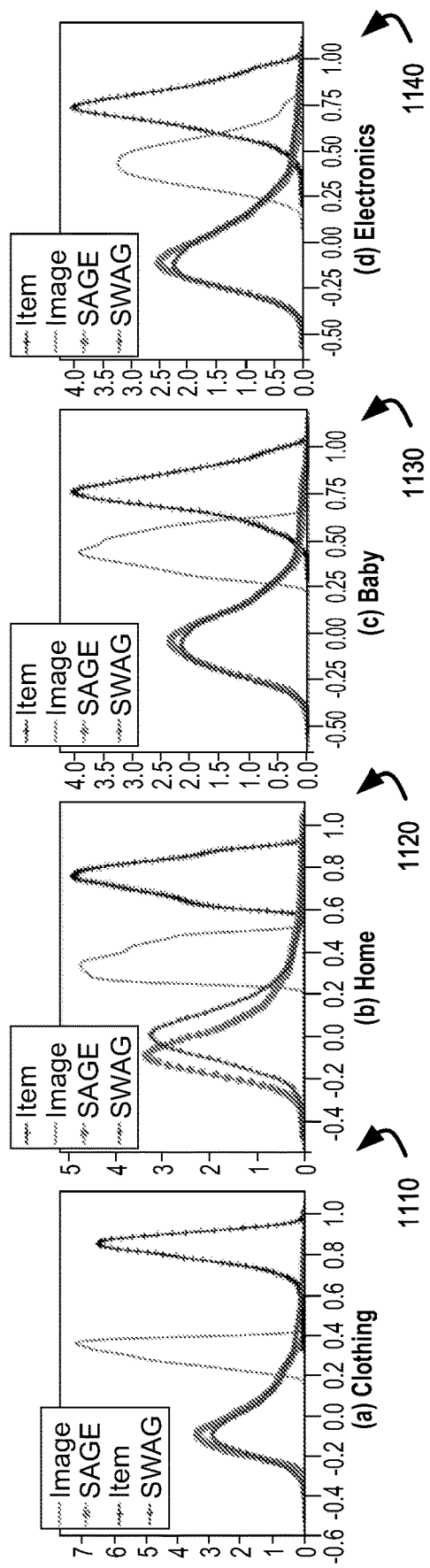
FIG. 11 illustrates a retailer interface useable for providing item recommendations, according to an example implementation.

FIG. 10 illustrates a retailer interface 1000 useable for providing item recommendations, according to an example implementation. The retailer interface 1000 can be presented within a retailer website, such as may be provided by a retail web server 12 as noted above. The retailer interface 1000 can be presented to a user a set of recommended products, e.g., based on a user selection of a particular item. As seen in the example, a selection of items 1004 can be presented to a user based on information returned to the retail web server 12 from system 100, in response to user selection of item 1002 (e.g., based on a determination using a weighted graph-based convolution, as described above). The specific recommendations will change according to which item is selected by the user, as well as the exact implementation chosen (as seen in FIG. 8).

FIGS. 11A-D illustrate probability densities of pairwise cosine similarity for image embeddings, text embeddings, graph-based embeddings, and weighted graph-based embeddings. the distribution of cosine similarities between pairs of items using Image, Item, SAGE and SWAG embeddings across the four categories considered above (in graphs 1110, 1120, 1130, and 1140). SWAG has the most spread out distribution across categories, indicating the ability to distinguish between items of different relevance and also avoiding any collusion in approximate algorithms to find K nearest neighbors (such as LSH). This is useful, because an important indication of the effectiveness of the learned embeddings is the widely distributed distances between random pairs of output embeddings. If all items are at about the same distance (i.e., the distances are tightly clustered) then the embedding space does not have enough "resolution" to distinguish between items of different relevance.

Figure 12:
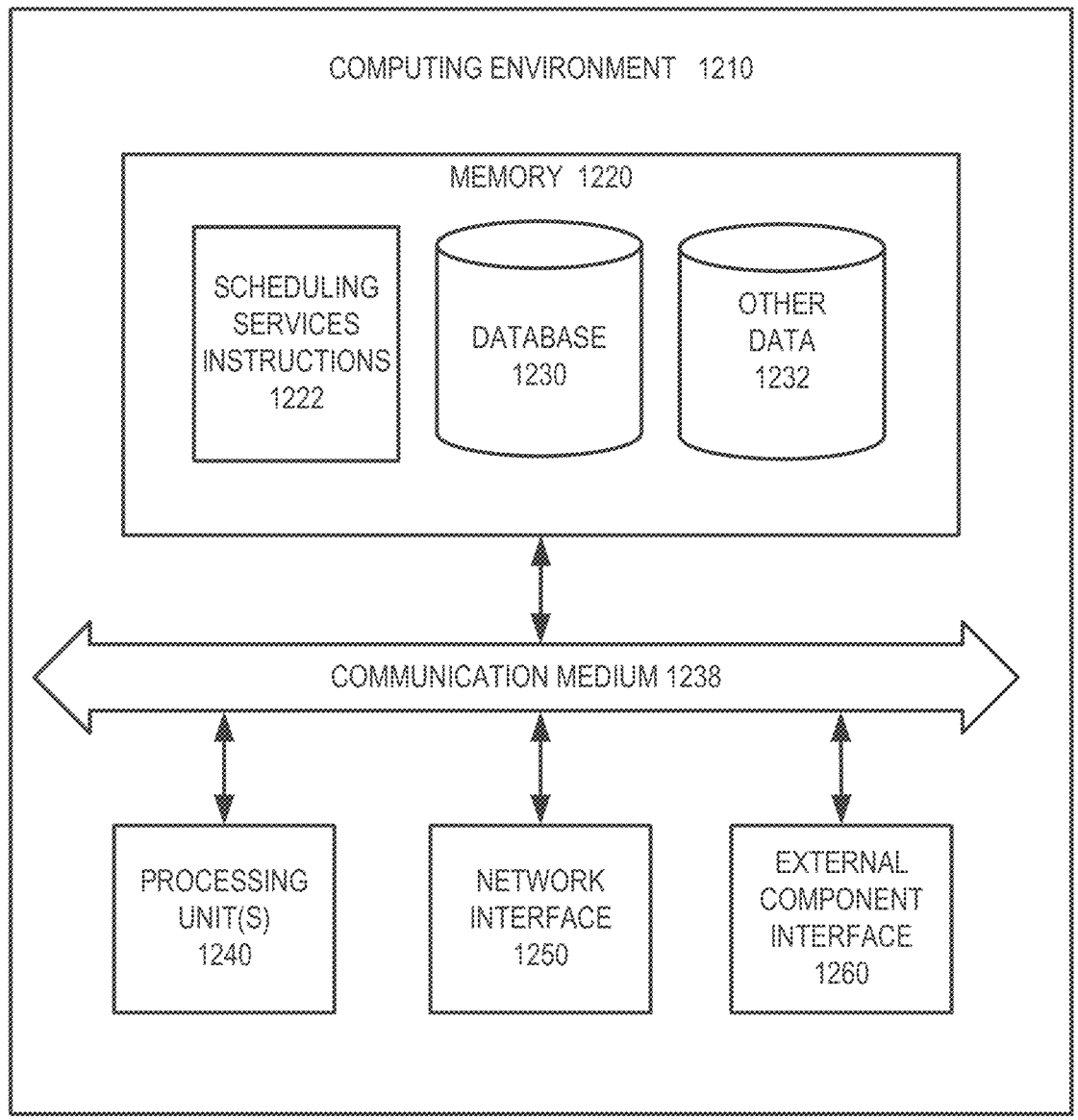
FIG. 12 illustrates an example computing environment with which aspects of the present disclosure can be implemented.

FIG. 12 illustrates an example system 1200 with which disclosed systems and methods can be used. In an example, the system 1200 can include a computing environment 1210. The computing environment 1210 can be a physical computing environment, a virtualized computing environment, or a combination thereof. The computing environment 1210 can include memory 1220, a communication medium 1238, one or more processing units 1240, a network interface 1250, and an external component interface 1260.

The memory 1220 can include a computer readable storage medium. The computer storage medium can be a device or article of manufacture that stores data and/or computer-executable instructions. The memory 1220 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1220 can store various types of data and software. For example, as illustrated, the memory 1220 includes scheduling services instructions 1222 for implementing one or more aspects of the scheduling services described herein, database 1230, as well as other data 1232. In some examples the memory 1220 can include instructions for generating a website and/or maintaining product information).

The communication medium 1238 can facilitate communication among the components of the computing environment 1210. In an example, the communication medium 1238 can facilitate communication among the memory 1220, the one or more processing units 1240, the network interface 1250, and the external component interface 1260. The communications medium 1238 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1240 can include physical or virtual units that selectively execute software instructions. In an example, the one or more processing units 1240 can be physical products comprising one or more integrated circuits. The one or more processing units 1240 can be implemented as one or more processing cores. In another example, one or more processing units 1240 are implemented as one or more separate microprocessors. In yet another example embodiment, the one or more processing units 1240 can include an application-specific integrated circuit (ASIC) that provides specific functionality. In yet another example, the one or more processing units 1240 provide specific functionality by using an ASIC and by executing computer-executable instructions.

The network interface 1250 enables the computing environment 1210 to send and receive data from a communication network (e.g., network 140). The network interface 1250 can be implemented as an Ethernet interface, a token-ring network interface, a fiber optic network interface, a wireless network interface (e.g., WI-FI), or another type of network interface.

The external component interface 1260 enables the computing environment 1210 to communicate with external devices. For example, the external component interface 1260 can be a USB interface, Thunderbolt interface, a Lightning interface, a serial port interface, a parallel port interface, a PS/2 interface, and/or another type of interface that enables the computing environment 1210 to communicate with external devices. In various embodiments, the external component interface 1260 enables the computing environment 1210 to communicate with various external components, such as external storage devices, input devices, speakers, modems, media player docks, other computing devices, scanners, digital cameras, and fingerprint readers.

Although illustrated as being components of a single computing environment 1210, the components of the computing environment 1210 can be spread across multiple computing environments 1210. For example, one or more of instructions or data stored on the memory 1220 may be stored partially or entirely in a separate computing environment 1210 that is accessed over a network.

Referring to FIGS. 1-12 overall, it is noted that the methods and systems described herein have a number of advantages over existing systems with respect to improving performance of generating item recommendations. It is noted that by way of comparison to other algorithms for generating item recommendations, improvements in view rates of 15-35% can be obtained, particularly over visual recommendations, or visual and behavioral recommendations based on other network types. Still further, the systems of the present disclosure can easily be tuned by adjusting parameters for a particular category based on number of neighbors in that category, to account for computing performance and accuracy. Other advantages are present as well, as described herein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of generating an item recommendation from among a retail item collection, the method comprising:
generating a weighted node-based graph on a graph convolutional network, wherein each node is representative of a different retail item from the retail item collection, wherein each node includes embedding that are generated based on an image and a description that are associated with the retail item, and wherein weights are assigned between pairs of nodes based on a likelihood that a selection of one retail item will prompt selection of another retail item from the retail item collection;
wherein the weight assigned to the node pair comprises an edge weight assigned to the node pair;
sampling from the weighted node-based graph to generate a sampled graph, wherein sampling includes selecting a plurality of nodes and, for each selected node, one or more node pairs, each node pair of the one or more node pairs including the node and one or more neighboring nodes, the selection of the one or more node pairs being based at least in part based on a weight assigned to the node pair in the weighted node-based graph, and a probability proportional to the weight of the edge and sampling parameters;

aggregating information from the one or more neighboring nodes into each corresponding node of the plurality of nodes in the sampled graph to generate a vector representation of the sampled graph, wherein aggregating information comprises applying one or more convolutional modules of the graph convolutional network;

applying a loss function to the vector representation of the sampled graph to generate a modified vector representation;

using the modified vector representation to generate, in response to identification of an item from an item collection, a selection of one or more recommended items from within the item collection; and presenting the selection of the one or more recommended items.

2. The method of claim 1, wherein the one or more convolutional modules are selected from among the group consisting of: a mean aggregator, a long-short term memory (LSTM) aggregator, a pooling aggregator, a node to vector aggregator, and the graphical convolutional network.

3. The method of claim 1, wherein the loss function includes the weight assigned to each node pair in the vector representation.

4. The method of claim 1, further comprising generating the weighted node-based graph, wherein each node of the weighted node-based graph represents an item, and wherein weights between each node and each of one or more neighboring nodes are assigned at least in part based on selections of products by users visiting a retailer website.

5. The method of claim 1, wherein the loss function comprises a graph-based loss function utilizing weights assigned to the node pairs.

6. The method of claim 5, wherein the loss function applies a stochastic gradient descent to the weights assigned to the node pairs and as a parameter provided to the one or more convolutional modules.

7. A system configured to generate item recommendations from a retail item collection, the system comprising:

a computing system including a programmable circuit operatively connected to a memory, the memory storing computer-executable instructions which, when executed by the programmable circuit, cause the computing system to perform:

generating a weighted node-based graph on a graph convolutional network, wherein each node is representative of a different retail item from the retail item collection, wherein each node includes an embedded image and an embedded description that are associated with the retail item, and wherein weights between the nodes are generated based on a likelihood that a selection of one retail item will prompt selection of another retail item from the retail item collection;

wherein the weight assigned to the node pair comprises an edge weight assigned to the node pair;

sampling from a weighted node-based graph to generate a sampled graph, wherein sampling includes selecting a plurality of nodes and, for each selected node, one or more node pairs, each node pair of the one or more node pairs including the node and one or more neighboring nodes, the selection of the one or more node pairs being based at least in part based on a weight assigned to the node pair in the weighted node-based graph, and a probability proportional to the weight of the edge and sampling parameters;

aggregating information from the one or more neighboring nodes into each corresponding node of the plurality of nodes in the sampled graph to generate a vector representation of the sampled graph, wherein aggregating information comprises applying one or more convolutional modules of the graph convolutional network;

applying a loss function to the vector representation of the sampled graph to generate a modified vector representation;

using the modified vector representation to generate, in response to identification of an item from an item collection, a selection of one or more recommended items from within the item collection; and presenting the selection of the one or more recommended items.

8. The system of claim 7, further comprising a retail web server, the computing system further configured to provide the selection of one or more recommended items to the retail web server.

9. The system of claim 8, wherein the computing system is configured to receive the identification of the item from the retail web server.

10. The system of claim 7, wherein the one or more convolutional modules are selected from among the group consisting of: a mean aggregator, a long-short term memory (LSTM) aggregator, a pooling aggregator, a node to vector aggregator, and the graphical convolutional network.

* * * * *